(12) United States Patent
Hall

(10) Patent No.: US 7,396,887 B1
(45) Date of Patent: Jul. 8, 2008

(54) INSITU REMOVAL OF CHELATOR FROM ANIONIC POLYMERIZATION REACTIONS

(75) Inventor: James E. Hall, Mogadore, OH (US)

(73) Assignee: Bridgestone Corporation, Chuo-Ku, Tokyo (JP)

( * ) Notice: Subject to any disclaimer, the term of this patent is extended or adjusted under 35 U.S.C. 154(b) by 0 days.

(21) Appl. No.: 11/617,913

(22) Filed: Dec. 29, 2006

(51) Int. Cl.
   *C08F 2/38* (2006.01)
   *C08F 4/48* (2006.01)
   *C08F 4/52* (2006.01)
   *C08F 279/02* (2006.01)

(52) U.S. Cl. .................. 526/78; 526/177; 526/178; 526/185; 526/196; 525/285; 525/308; 525/316; 525/331.9; 525/942

(58) Field of Classification Search .................. 526/78, 526/177, 178, 185, 196; 525/285, 308, 316, 525/331.9, 942
See application file for complete search history.

(56) References Cited

U.S. PATENT DOCUMENTS

| | | | |
|---|---|---|---|
| 4,068,050 A | 1/1978 | Danzig et al. | |
| 4,429,091 A * | 1/1984 | Hall ........................... | 526/181 |
| 4,476,240 A * | 10/1984 | Hall et al. .................... | 502/155 |
| 4,518,753 A * | 5/1985 | Richards et al. ............. | 549/513 |
| 4,581,429 A | 4/1986 | Solomon et al. | |
| 4,591,624 A * | 5/1986 | Hall ........................... | 526/177 |
| 4,845,165 A * | 7/1989 | Halasa et al. ................. | 526/78 |
| 4,960,831 A | 10/1990 | Willis et al. | |
| 5,077,346 A | 12/1991 | Dias et al. | |
| 5,322,912 A | 6/1994 | Georges et al. | |
| 5,401,804 A | 3/1995 | Georges et al. | |
| 5,549,998 A | 8/1996 | Georges et al. | |
| 5,627,248 A | 5/1997 | Koster et al. | |
| 5,677,388 A | 10/1997 | Koster et al. | |
| 5,721,320 A | 2/1998 | Priddy et al. | |
| 5,869,588 A | 2/1999 | Toan et al. | |
| 5,919,871 A | 7/1999 | Nicol et al. | |
| 5,959,033 A | 9/1999 | Demirors et al. | |
| 6,103,846 A * | 8/2000 | Willis et al. ................. | 526/335 |
| 6,111,025 A | 8/2000 | Visger et al. | |
| 6,228,908 B1 | 5/2001 | Takeichi et al. | |
| 6,255,402 B1 | 7/2001 | Boutillier et al. | |
| 6,271,308 B1 | 8/2001 | de Boer et al. | |
| 6,333,381 B1 | 12/2001 | Asada et al. | |
| 6,353,065 B1 | 3/2002 | Charleux et al. | |
| 6,362,269 B1 | 3/2002 | Ishihata et al. | |
| 6,369,162 B1 | 4/2002 | Visger et al. | |
| 6,376,615 B1 | 4/2002 | Guerrero-Santos et al. | |
| 6,420,502 B1 | 7/2002 | Chung | |
| 6,444,754 B1 | 9/2002 | Chin et al. | |
| 6,476,133 B1 * | 11/2002 | Jungling et al. ............. | 525/122 |
| 6,521,710 B1 | 2/2003 | Roth et al. | |
| 6,525,140 B1 | 2/2003 | Dedecker | |
| 6,525,151 B1 | 2/2003 | Roth et al. | |
| 6,531,547 B1 | 3/2003 | Visger et al. | |
| 6,624,263 B2 | 9/2003 | Matyjaszewski et al. | |
| 6,673,892 B2 | 1/2004 | Martinez et al. | |
| 6,762,218 B2 | 7/2004 | Geprags et al. | |
| 6,780,917 B2 | 8/2004 | Hashimoto et al. | |
| 7,125,940 B2 * | 10/2006 | Willis .......................... | 526/173 |
| 2002/0045685 A1 | 4/2002 | Ogoe et al. | |
| 2003/0050411 A1 | 3/2003 | Gaynor et al. | |
| 2003/0065097 A1 | 4/2003 | De Groot et al. | |
| 2004/0030021 A1 | 2/2004 | Mitsunaga et al. | |
| 2004/0157994 A1 | 8/2004 | Kubo et al. | |

FOREIGN PATENT DOCUMENTS

| | | |
|---|---|---|
| WO | WO 97/36894 A1 | 10/1997 |
| WO | WO 97/49741 A1 | 12/1997 |
| WO | WO 97/49742 A1 | 12/1997 |
| WO | WO 99/46261 A1 | 9/1999 |
| WO | WO 02/48109 A2 | 6/2002 |

OTHER PUBLICATIONS

Braun, Dietrich, "Alkane als initiatoren zur radikalischen polymerization", Angewandte Makromolekulare Chemie, vol. 223, Issue 1, pp. 69-79, Mar. 12, 2003, English Abstract.

Cameron, Neil R. et al., "Butyl Acrylate Polymerization Mediated by a Proxyl Nitroxide", Polymer Preprints 2002, 43 (2), p. 88.

Chin, Hui H., "Compatibilization of poly(phenylene ether) and polyamide-6,6 blends by functionalized polystyrenes", Annual Technical Conference—SPE (2002) 60th, vol. 2, pp. 1329-1333, Abstract only.

(Continued)

*Primary Examiner*—Fred M Teskin
(74) *Attorney, Agent, or Firm*—Jenny L. Sheaffer; Meredith E. Hooker

(57) ABSTRACT

A process for producing polymers having at least one high vinyl end segment is provided. The process comprises: (a) forming a living prepolymer high vinyl initiator with a vinyl content greater than about 45% using a vinyl modifier, (b) adding a $R_1R_2R_3$aluminum or $R_1R_2R_3$boron compound to nullify the effect of the vinyl modifier, and (c) initiating polymerization of diene monomers using said living prepolymer high vinyl initiator so as to form a polymer product with at least one high vinyl end segment, where $R_1$, $R_2$, and $R_3$ are selected from the group consisting of C1-C12 alkyl, C2-C12 alkene, C2-C12 alkyne, phenyl, and alkyl-substituted phenyl, and may all be identical or may all be separately selected but cannot be H. The polymers having at least one high vinyl end segment may be coupled to produce a polymer having a high vinyl end segment on all ends.

26 Claims, No Drawings

OTHER PUBLICATIONS

Frolov, V.M. et al., "Hydrogenation of Polybutadiene and Butadiene—Vinyltrimethyllsilane Copolymers in the Presence of Metal-Complex Catalysts", Polymer Science, Ser. A, vol. 43, No. 11, pp. 1114-1118, 2001.

Georges, M.K. et al., "Narrow Molecular Weight Resins by a Free-Radical Polymerization Process", Macromolecules, vol. 26, pp. 2987-2988, 1993.

Georges, Michael K. et al., "Stable Free Radical Polymerization Process- Initiation Mechanisms with Benzoyl Peroxide and Various Nitroxides", Polymer Preprints 2002, 43 (2), p. 78.

Gopalan, Padma et al., "Synthesis of Rod-Coil Diblock Copolymers via Nitroxide Functionalized Mesogenic Rod Segments", Polymer Preprints 2002, 43 (2), p. 110.

Han, H. et al., "Boroxyl-Based Living Free Radical Initiators", Polymer Preprints 2002, 43 (2), p. 82.

Hawker, C.J., "Molecular Weight Control by a Living Free-Radical Polymerization Process", J. Am. Chem. Soc., 116, pp. 11185-11186, 1994.

Jayaraman, R.B. et al., "Epoxy and Hydroxy Functional Polyolefin Macromonomers", Journal of Polymer Science: Part A: Polymer Chemistry, vol. 34, pp. 1543-1552, 1996.

Kobatake, Seiya et al., "Block Copolymer Synthesis by Styrene Polymerization Initiated with Nitroxy-Functionalized Polybutadiene", Macromolecules preprinted from vol. 31, No. 11, pp. 3735-3739.

Li, Irene et al., "Synthesis, Characterization and Evaluation of Initiators for Living Free Radical Polymerization: Synthesis of Polystyrene with Controlled Structure", Polymer Preprints, vol. 36, No. 1, pp. 469-470, 1995.

Moad, Graeme et al., "Reactions of Benzoyloxyl Radicals with Some Common Vinyl Monomers", Makromol. Chem, Rapid Commun., pp. 533-536, 1992.

Nuyken, Oskar et al., "New Concepts for Controlled Radical Polymerization: The DPE-System", Polymer Preprints 2002, 43 (2), p. 84.

Pfaendner, Rudolf et al., "Nitroxyl Based Controlled Free Radical Polymerization- An Additives Manufacturer's Approach", presentation at Commercialization of Controlled Polymer Synthesis, San Francisc Sep. 16-17, 1999.

Priddy, Duane B. et al., "Utility/Limitations of Nitroxide Mediated Polymerization for Low Cost Manufacture of Improved Styrenic Polymers", Polymer Preprints 2002, 43 (2), p. 102.

Quirk, Roderic P. et al., "Anionic Synthesis of Amine-Functionalized Polybutadienes and Their Hydrogenated Analogs", Polymer Preprints 2002, 43(2), pp. 973-974.

Raether, Benedikt et al., "Free-Radical Synthesis of Block Copolymers on an Industrial Scale", Macromolecules Symp., vol. 177, pp. 25-41, 2002.

Rizzardo, E., "Living Free Radical Polymerization", Chemistry in Australia, p. 32, 1987.

Tharanikkarasu, K. et al., "Tetraphenylethane Iniferters: Polyurethane-Polystyrene Multiblock Copolymers Through "Living" Radical Polymerization", Journal of Applied Polymer Science, vol. 66, pp. 1551 1997.

Whitesides, G.M. et al., "Reaction of n-Butyllithium and 2,2,6,6-Tetramethylpiperidine Nitroxyl", J. Org. Chem., vol. 40, No. 23, pp. 3448-3450, 1975.

* cited by examiner

US 7,396,887 B1

INSITU REMOVAL OF CHELATOR FROM ANIONIC POLYMERIZATION REACTIONS

FIELD OF THE DISCLOSURE

The disclosure relates to methods for producing polymer compositions with high vinyl end segments.

BACKGROUND OF DISCLOSURE

Polymers and copolymers of conjugated dienes such as polybutadiene, polyisoprene, and styrene-butadiene rubbers possess physical properties which make them suitable for many important applications such as synthetic rubbers and as additives to other polymeric systems such as, for example, high impact polystyrene (HIPS). HIPS can be manufactured by polymerizing styrene in the presence of 5-10% dissolved polybutadiene or butadiene copolymer. During the polymerization of the styrene, the polybutadiene or butadiene copolymer is grafted onto the styrene polymer chain. To increase the grafting efficiency of the polybutadiene, it is desirable for the polybutadiene to have end segments having a high vinyl content rather than cis or trans configurations, The vinyl content refers to alkenyl groups configured pendant to the polymer backbone, as opposed to cis and trans configurations which contain the alkenyl groups within the polymer backbone. The terms vinyl content and vinyl bond content are used interchangeably herein.

Polymers with high vinyl end segments can be produced by initiating polymerization and allowing the reaction to proceed to near completion. As the polymerization reaction approaches completion, additional monomer and a vinyl modifier are added. The vinyl modifer increases the number of vinyl configured bonds that are formed during polymerization, hence leading to increased vinyl content. The final segment of the polymer thus has a higher vinyl bond content than the beginning segment. The vinyl concentration of the end segment can be controlled to levels as high as about 70%. However, if one wishes both ends of the polymer, or the ends of a star branched polymer, to have high vinyl content with the remaining segments having low vinyl content, this method will not work because coupling reactions result in high vinyl in the center of the polymer chain or star branched polymer.

To produce linear or branched polymers with all ends having a high vinyl content, an organo-dilithium initiator can be used to polymerize a low vinyl middle segment. Subsequently, additional monomer and a vinyl modifier are added to produce ends having a high vinyl content. This method avoids the need for a coupling agent. However, organo-dilithium initiators are expensive and unstable.

Alternatively, linear or branched polymers with all ends having a high vinyl content may be produced by first forming a living prepolymer high vinyl initiator by anionic polymerization of monomer units in the presence of a vinyl modifier. The living prepolymer high vinyl initiator is then utilized to initiate polymerization of additional monomer units, thus producing a polymer having a high vinyl end and a low vinyl end. The low vinyl end is formed as a result of the extra monomer units lowering the concentration of the vinyl modifier. The polymers are then coupled between the low vinyl ends, producing a polymer with each end containing a high vinyl segment. However, if this method is used in a batch polymerization process, the transition from high vinyl to low vinyl is gradual since the change results from the decrease in concentration of the vinyl modifier upon addition of additional monomer. Since the transition is gradual, the higher the desired vinyl content in the end segment is, the higher the vinyl content in the middle portion of the polymer chain will be. Further, dilution of the modifier is not an effective method when chelating modifiers are used.

The above method may also be used in a continuous process, wherein the living prepolymer high vinyl initiator is made continuously in one reactor and fed to a second reactor where the bulk of the polymer is made. In comparison to a batch process, a continuous process utilizing the above method can produce a more abrupt change in vinyl content. However, the abrupt change is caused by using a higher temperature in the second reactor, which lessens the effectiveness of the vinyl modifier.

There remains a need for a process to produce polymers having high vinyl segments on all ends, which does not require the use of expensive and unstable organo-dilithium initiators. Furthermore, there remains a need for a process in which a higher vinyl content may be obtained on the end segments without increasing the vinyl content of the middle segment. Additionally, there remains a need for a process that is capable of providing a more abrupt change in vinyl content without the need for a temperature differential to lessen the effectiveness of the vinyl modifier.

SUMMARY OF DISCLOSURE

A process for producing polymers having at least one high vinyl end segment is provided. The process comprises: (a) forming a living prepolymer high vinyl initiator with a vinyl content greater than about 45% using a vinyl modifier, (b) adding a $R_1R_2R_3$aluminum or $R_1R_2R_3$boron compound to nullify the effect of the vinyl modifier, and (c) initiating polymerization of diene monomers using said living prepolymer high vinyl initiator so as to form a polymer product with at least one high vinyl end segment, where $R_1$, $R_2$, and $R_3$ are selected from the group consisting of C1-C12 alkyl, C2-C12 alkene, C2-C12 alkyne, phenyl, and alkyl-substituted phenyl, and may all be identical or may all be separately selected but cannot be H.

The process may further comprise using a coupler to couple the polymer product with a high vinyl end segment to produce a further product with at least two high vinyl end segments.

A method of producing an engineered plastic selected from the group consisting of high impact polystyrene, styrene-maleic anhydride copolymer, methylmethacrylate-butadiene-styrene copolymer, transparent impact polystyrene, and acrylonitrile butadiene styrene copolymer is also provided. The method comprises the steps of: (a) (1) forming a living prepolymer high vinyl initiator with a vinyl content greater than about 45% using a vinyl modifier, (2) adding a $R_1R_2R_3$aluminum or $R_1R_2R_3$boron compound to nullify the effect of the vinyl modifier, and (3) initiating polymerization of diene monomers using said living prepolymer high vinyl initiator so as to form a polymer product with at least one high vinyl end segment, where $R_1$, $R_2$, and $R_3$ are selected from the group consisting of C1-C12 alkyl, C2-C12 alkene, C2-C12 alkyne, phenyl, and alkyl-substituted phenyl, and may all be identical or may all be separately selected but cannot be H; (b) adding the polymer product with at least one high vinyl end segment to a solvent comprising at least one vinyl monomer; (c) optionally adding at least one additional inert solvent; (d) optionally adding additive selected from the group consisting of extender oils, modifiers, and antioxidants; (e) initiating polymerization of the vinyl monomer by the use of an initiator and/or heat, wherein steps (b)-(d) can be performed in any order.

An additional process for producing polymers having at least one high vinyl end segment is provided. The process comprises: (a) forming a living prepolymer high vinyl initiator with a vinyl content greater than about 45% using a vinyl modifier, (b) adding a $R_1R_2R_3$aluminum or $R_1R_2R_3$boron compound to nullify the effect of the vinyl modifier, and (c) initiating polymerization of diene monomers using said living prepolymer high vinyl initiator so as to form a polymer product with at least one high vinyl end segment, where $R_1$, $R_2$, and $R_3$ are selected from the group consisting of C1-C12 alkyl, C2-C12 alkene, C2-C12 alkyne, phenyl, and alkyl-substituted phenyl, and may all be identical or may all be separately selected but cannot be H, where step (c) is conducted at a maximum temperature that is no more than 20° C. higher than the maximum temperature at which steps (a) and (b) are conducted.

The process may further comprise using a coupler to couple the polymer product with a high vinyl end segment to produce a further product with at least two high vinyl end segments.

DETAILED DESCRIPTION

Preparation of the living prepolymer high vinyl initiator is carried out by adding an initiator to a mixture of monomers in the presence of a vinyl modifier. Any initiator known in the art as suitable for the polymerization of conjugated dienes may be used. Suitable initiators include anionic initiators. Organolithium initiators are exemplary anionic initiators, but other anionic initiators are well known to those of skill in the art and may be utilized. Preferred organo-lithium initiators have the formula $RLi_x$, wherein R represents a hydrocarbyl radical of about 1 to about 20, preferably about 2 to about 8 carbon atoms per R group and x is an integer from 1 to about 4. Typical R groups include aliphatic and cycloaliphatic groups. Specific examples of R groups for substitution in the above formulas include primary, secondary, and tertiary groups, such as n-propyl, isopropyl, n-butyl, isobutyl, t-butyl, and mixtures thereof.

Specific examples of suitable lithium initiators include n-butyl lithium, p-tolyllithium, 4-phenylbutyl lithium, 4-butylcyclohexyl lithium, lithium dialkyl amines, lithium dialkyl phosphines, lithiumalkyl aryl phosphine, lithium diaryl phosphines and mixtures thereof.

The anionic initiator is employed in an amount designed to result in the desired molecular weight of the polymer. The ratio of millimoles of the anionic initiator per hundred grams of the anionically polymerizable monomer ranges between 0.1 millimoles to 100 millimoles, or between 0.2 millimoles to 20 millimoles, or between 0.5 millimoles to 4 millimoles.

Initiator is added to a mixture of monomers in a suitable hydrocarbon solvent in the presence of a vinyl-modifier. Exemplary monomers include conjugated dienes and vinyl monomers. Exemplary conjugated dienes include 1,3-butadiene, isoprene (2-methyl-1,3-butadiene), 2-ethyl-1,3-butadiene, 2,3-dimethyl-1,3-butadiene, piperylene (1,3-pentadiene), 2-methyl-1,3-pentadiene, 3-methyl-1,3-pentadiene, 4-methyl-1,3-pentadiene, 2,4-dimethyl-1,3-pentadiene, 1,3'-hexadiene, and the like. Exemplary vinyl monomers include 1,2-diphenyl-4-methyl-1-hexene, styrene, α-methylstyrene, p-methylstyrene, vinyl toluene, vinyl anthracene, vinyl pyridines such as 2-vinylpyriene and 4-vinylpyridine, vinyl naphthalene such as 1-vinylnaphthalene, 2-vinylnaphthalene, 1-α-methylvinylnaphthalene, 2-α-methylvinylnaphthalene, and the like, and mixtures thereof.

Suitable solvents used in the preparation of the living prepolymer high vinyl initiator include hydrocarbon solvents such as pentane, hexane, heptane, octane, nonane, decane, cyclopentane, cyclohexane, cycloheptane, cyclooctane, and mixtures thereof.

A vinyl modifier is added to increase the 1,2-addition reaction of the diene monomer in the preparation of the living prepolymer high vinyl initiator. Such modifying agents are known in the art. These modifying agents may be employed in amounts generally ranging from about 1:100 to about 100:1 molar ratio of the modifier to anionic initiator. This yields a living prepolymer with molecular weight of about 500 to about 5,000. The 1,2-addition product can be increased from about the 5-15% range to as high as about 90-100% of the diene monomer units being incorporated into the living prepolymer high vinyl initiator. The preferred vinyl content of the living prepolymer high vinyl initiator is greater than about 45%, more preferably greater than about 50%.

Exemplary vinyl modifiers include one or more of hexamethylphosphoric acid triamide, N,N,N',N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo [2.2.2] octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, dipiperidino ethane, tri-n-propyl amine, trimethyl amine, triethyl amine, N,N-dimethyl aniline, N-ethylpiperidine, N-methyl-N-ethyl aniline, and N-methylmorpholine.

The number average molecular weight ($M_n$) of the living prepolymer high vinyl initiator is in the range of about 100 to 20,000, preferably in the range of about 250 to 5000, and most preferably in the range of about 500 to 2500.

After forming the living prepolymer high vinyl initiator, a $R_1R_2R_3$aluminum or $R_1R_2R_3$boron compound is added to the living prepolymer high vinyl initiator. In the above formulas, $R_1$, $R_2$, and $R_3$ are selected from the croup consisting of C1-C12 alkyl, C2-C12 alkene, C2-C12 alkyne, phenyl, and alkyl-substituted phenyl, and may all be identical or may all be separately selected but cannot be H. Exemplary $R_1R_2R_3$aluminum or $R_1R_2R_3$boron compounds include trialkyl compounds. Suitable trialkyl compounds include triethylaluminum, trimethylaluminum, and triisobutylaluminum.

The purpose of adding the $R_1R_2R_3$aluminum or $R_1R_2R_3$boron compound is to nullify the effect of the vinyl modifier. One advantage of nullifying the effect of the vinyl modifier is that additional monomers may be subsequently polymerized into a low vinyl content configuration by simply combining the mixture of living prepolymer high vinyl initiator and $R_1R_2R_3$aluminum or $R_1R_2R_3$boron compound with additional monomer and a suitable solvent. The living prepolymer high vinyl initiator initiates the polymerization of the monomers by continuing living anionic polymerization. Thus, a living polymer with one high vinyl end segment is produced.

Preferred monomer units that may be added to the living prepolymer high vinyl initiator are conjugated dienes and vinyl-substituted aromatic hydrocarbons. The polymers with one high vinyl end segment can contain more than one monomer unit, in a random or block configuration. Suitable conjugated dienes include one or more of 1,3-butadiene, isoprene, 2,3-dimethyl-1,3-butadiene, and 1,3-pentadiene. Preferred conjugated dienes are 1,3-butadiene and/or isoprene.

Suitable vinyl-substituted aromatic hydrocarbons include one or more of styrene, α-methylstyrene, 1-vinyl naphthalene, 2-vinyl naphthalene, 1-α-methy vinyl naphthalene, 2-α- methyl vinyl naphthalene, as well as alkyl, cycloalkyl, aryl, alkaryl, and aralkyl derivatives thereof, in which the total number of carbon atoms in the combined hydrocarbon is generally not greater than 12, as well as any di- or tri-vinyl substituted aromatic hydrocarbons. One preferred vinyl-substituted aromatic hydrocarbon is styrene. If the di- or tri-vinyl substituted aromatic hydrocarbons are used, the resulting polymer has a branched and/or crosslinked structure.

Suitable solvents in this step include one or more of pentane, hexane, heptane, octane, nonane, decane, cyclopentane, cyclohexane, cycloheptane, cyclooctane.

The polymerization temperature can vary over a broad range from about −50° C. to about 200° C., or from about −20° C. to about 140° C. One advantage of using the $R_1R_2R_3$aluminum or $R_1R_2R_3$boron compound to nullify the effect of the vinyl modifier is that the polymerization temperature does not have to be significantly higher than the temperature at which the living prepolymer high vinyl initiator is formed to create a lower vinyl content. Accordingly, the polymerization temperature may optionally be no more than 20° C. higher than the temperature(s) at which the living prepolymer high vinyl initiator is formed or the $R_1R_2R_3$aluminum or $R_1R_2R_3$boron compound is added. The pressure used preferably is sufficient to maintain the fluidity of the substantially liquid phase under the conditions of the polymerization reaction.

The polymerization reaction is generally conducted for a time sufficient to obtain at least about 80% and preferably about 99% conversion of charged monomer units. The $M_n$ of the uncoupled polymer is in the range of about 20,000 to 500,000, more preferably in the range of about 30,000 to 400,000, and most preferably in the range of about 40,000 to about 300,000.

The living prepolymer high vinyl end segment accounts for a minor portion of the total weight of the polymer composition. For example, the living prepolymer high vinyl end segment may account for less than about 15% of the total weight of the polymer composition, or less than about 10% of the total weight, or less than about 5%. Therefore, the vinyl content of the living prepolymer high vinyl end segment has very little effect on the total vinyl content of the polymer composition. The preferred vinyl content of the total polymer composition is less than about 35%, and preferably less than about 30%.

The living polymer with one high vinyl end segment may be produced by a batch or a continuous process. To make the living polymer in a continuous mode, the living prepolymer high vinyl initiator is made continuously in one reactor and fed to a second reactor where the living polymer with one high vinyl end segment is produced.

The living polymer with one high vinyl end segment produced above may then be coupled to other living polymers having one high vinyl end segment. Coupling results in a polymer having a high vinyl end segment on all ends of the polymer chain. A wide variety of coupling agents can be used to couple the living polymers. A di-coupling agent will result in a linear polymer with both end segments having high vinyl content. A tri-coupling agent will result in a star-shaped polymer with all three end segments having high vinyl content, and a tetra-coupling agent will result in a star-shaped polymer with all four end segments having high vinyl content.

Suitable coupling agents include, but are not limited to, $SnCl_4$, alkyl $SiCl_3$, $CO_2$, $CCl_4$, $SiCl_4$, $PNCl_2$, divinylbenzene, butyl benzoate, $CCl_3COOEt$, and mixtures thereof.

The appropriate amount of coupling agent is calculated based on the amount needed to react with the number of initiator atoms present in the polymer. For example, with a tetrafunctional coupling agent, such as $SnCl_4$, one-fourth of the molecular weight of $SnCl_4$ is calculated as required for each atom of initiator present. As a by-product, the initiator, e.g., $Li^+$, is removed by reaction with chlorine and precipitated from the reaction solution as LiCl.

Other additives known in the art can be added. Stabilizers, antioxidants, conventional fillers, reinforcing agents, reinforcing resins, pigments, fragrances, and the like are examples of some such additives. Specific examples of useful antioxidants and stabilizers include 2-(2'-hydroxy-5'-methylphenyl)benzotriazole, nickel di-butyl-di-thiocarbamate, tris(nonylphenyl) phosphite, 2,6-di-t-butyl-4-methylphenol, and the like. Exemplary conventional fillers and pigments include silica, carbon black, titanium dioxide, iron oxide, and the like. These compounding ingredients are incorporated in suitable amounts depending upon the contemplated use of the product, preferably in the range of 1-350 parts by weight of additives or compounding ingredients per 100 parts by weight of the polymer composition.

A reinforcing agent may be defined as material added to a resinous matrix to improve the strength of the polymer. Most reinforcing materials are inorganic or organic products of high molecular weight. Various examples include glass fibers, asbestos, boron fibers, carbon and graphite fibers, whiskers, quartz and silica fibers, ceramic fibers, metal fibers, natural organic fibers, and synthetic organic fibers. Other elastomers and resins are also useful to enhance specific properties like damping properties, adhesion, and processability.

The polymer compositions of the present disclosure are useful as additives in the preparation of engineered plastics. Engineered plastics may be prepared by adding either the uncoupled polymer containing a high vinyl end segment or the coupled polymer having all ends containing a high vinyl segment to a suitable solvent which contains at least one vinyl monomer. Optionally, at least one additional inert solvent may be also used. The polymer/solvent mixture may also optionally contain additives selected from the group consisting of extender oils, modifiers, and antioxidants. Polymerization of the vinyl monomer is initiated by the use of an initiator and/or heat. Exemplary engineered plastics that may be made by this process include, but are not limited to, high impact polystyrene, styrene-maleic anhydride copolymer, methyl-methacrylate-butadiene-styrene copolymer, transparent impact polystyrene, and acrylonitrile butadiene styrene copolymer.

Suitable initiators include free radical initiators. Exemplary free radical initiators include dilauroyl peroxide lauroyl acid, dioctanoyl peroxide caprylic acid, didecanoyl peroxide n-decanoic acid, di-n-propionyl peroxide propionic acid, bis (3,5,5-trimethyl hexanoyl) 3,5,5-trimethyl peroxide hexanoic acid, dibenzoyl peroxide benzoic acid, bis(2,4-dichlorobenzoyl) 2,4 dichlorobenzoic acid peroxide, bis(o-methybenzoyl) peroxide o-methyl benzoic acid, acetyl cyclohexane sulphonyl cyclohexane sulphonic peroxide acid, t-butylperoxypivalate pivalic acid, t-butyl peroxy-2-ethylhexanoate 2-ethyl caproic acid, t-butyl peroxy isobutyrate isobutyric acid, and t-butyl peroxybenzoate benzoic acid.

Suitable vinyl monomers for preparing engineered plastics include, but are not limited to, styrene, divinyl benzene, α-methylstyrene, 1-vinyl naphthalene, 2-vinyl naphthalene, 1-α-methy vinyl naphthalene, and 2-α-methyl vinyl naphthalene.

Suitable solvents in this step include, but are not limited to, one or more of pentane, hexane, heptane, octane, nonane, decane, cyclopentane, cyclohexane, cycloheptane, cyclooctane.

Any extender oil, modifier, and antioxidant may be used. Such materials are well known to those skilled in the art. Examples of such materials are listed above.

The present invention will be described in more detail with reference to the following examples. The following examples are presented for purposes of illustration only and are not to be construed in a limiting sense.

EXAMPLES

Examples 1 and 2 were produced by charging bottles with hexane and a 21.4% blend of 1,3-butadiene in hexane to obtain a concentration of 1,3-butadiene as shown in Table 1. n-butyl lithium and bis-oxalyanyl propane were added to both bottles in the amounts shown in Table 1. Triethylaluminum was added to Example 2 in the amount shown in Table 1. The polymerization was conducted for 18 hours at 50° C. The polymers were precipitated in isopropanol and drum-dried. The analytical results in Table 1 show that the triethylaluminum in Example 2 effectively nullified the effect of the bis-oxalyanyl propoane to produce a polybutadiene with a significantly lower vinyl content than Example 1. Mw represents the weight average molecular weight, and Mn represents the number average molecular weight. Mw and Mn values are obtained from a calibrated GPC (Gel Permeation Chromatography) instrument.

TABLE 1

|  | Example 1 | Example 2 |
|---|---|---|
| % 1,3-butadiene in hexane | 14.3% | 14.2% |
| n-butly lithium (mmol) | 0.616 | 0.616 |
| bis-oxalanyl propane (mmol) | 0.21 | 0.21 |
| triethylaluminum (mmol) | 0.00 | 0.25 |
| R.I. | 1.5104 | 1.5158 |
| % vinyl (R.I.) | 63% | 26% |
| $^1$H NMR % vinyl | 61.2% | 21.7% |
| Mn (GPC) | 69,000 | 73,200 |
| Mw/Mn | 1.1105 | 1.2168 |

Example 3 was prepared by charging a bottle with hexane and a 21.4% blend of 1,3-butadiene in hexane to obtain a concentration of 1,3-butadiene as shown in Table 2. n-butyl lithium and bis-oxalyanyl propane were added to the bottle. Example 3 was polymerized at 0° C. for 4 hours to prepare a living prepolymer high vinyl initiator. Example 4 was prepared by charging Example 3 into a 1 gallon reactor containing 1,3-butadiene in hexane in the concentration shown in Table 2. The 1 gallon reactor also contained triethylaluminum. The polymerization was conducted at 12-68° C. for 2 hours. The results in Table 2 show that triethylaluminum nullified the effect of the bis-oxalyanyl propane to produce a polybutadiene having a low vinyl content.

TABLE 2

|  | Example 3 | Example 4 |
|---|---|---|
| % 1,3-butadiene in hexane | 10.7% | 14.4% |
| n-butly lithium (mmol) | 1.00 | 1.00 |
| bis-oxalanyl propane (mmol) | 0.47 | 0.47 |
| triethylaluminum (mmol | 0.00 | 0.54 |
| R.I. | 1.5 | 1.5165 |
| % vinyl (R.I.) | 66% | 21% |
| $^1$H NMR % vinyl | 84.7% | 14.4% |
| Mn (GPC) | 3,600 | 62,700 |
| Mw/Mn | 1.0862 | 1.1797 |

The invention claimed is:

1. A process comprising:
    a. forming a living prepolymer high vinyl initiator with a vinyl content greater than about 45% using a vinyl modifier,
    b. adding a $R_1R_2R_3$aluminum or $R_1R_2R_3$boron compound, and
    c. initiating polymerization of diene monomers using said living prepolymer high vinyl initiator so as to form a polymer product with at least one high vinyl end segment,
    wherein said polymer product has an overall vinyl content of less than 35%, and
    where $R_1$, $R_2$, and $R_3$ are selected from the group consisting of C1-C12 alkyl, C2-C12 alkene, C2-C12 alkyne, phenyl, alkyl-substituted phenyl and may all be identical or may all be separately selected but cannot be H.

2. A process as claimed in claim 1 wherein the $R_1R_2R_3$ aluminum or $R_1R_2R_3$boron compound are trialkyl compounds.

3. A process as claimed in claim 1 wherein the $R_1R_2R_3$ aluminum compound is triethylaluminum.

4. A process as claimed in claim 1 wherein step (a) comprises combining an anionic initiator, monomer and a vinyl modifier, wherein said monomer comprises at least one conjugated diene monomer.

5. A process as claimed in claim 4 wherein said anionic initiator is an organolithium compound.

6. A process as claimed in claim 4 wherein said monomer comprises 1,3-butadiene.

7. A process as claimed in claim 1 wherein the vinyl modifier comprises at least one of hexamethylphosphoric acid triamide, N,N,N',N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo [2.2.2] octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, tri-n-propyl amine, trimethyl amine, triethyl amine, N,N-dimethyl aniline, N-ethylpiperidine, N-methyl-N-ethyl aniline, and N-methylmorpholine.

8. A process as claimed in claim 4 wherein said monomer further comprises at least one vinyl monomer.

9. A process as claimed in claim 1 wherein said polymerization in step (c) further comprises the use of at least one vinyl monomer.

10. A process comprising:
    a. forming a living prepolymer high vinyl initiator with a vinyl content greater than about 45% using a vinyl modifier,
    b. adding a $R_1R_2R_3$aluminum or $R_1R_2R_3$boron compound, and
    c. initiating polymerization of diene monomers using said living prepolymer high vinyl initiator so as to form a polymer product with a high vinyl end segment,
    wherein said polymer product has an overall vinyl content of less than 35%, and
    where $R_1$, $R_2$, and $R_3$ are selected from the group consisting of C1-C12 alkyl, C2-C12 alkene, C2-C12 alkyne, phenyl, alkyl-substituted phenyl, and mixtures thereof and may all be identical or may all be separately selected but cannot be H where step (c) is conducted at a maximum temperature that is no more than 20° C. higher than the maximum temperature at which steps (a) and (b) are conducted.

11. A process as claimed in claim 10 wherein the $R_1R_2R_3$ aluminum or $R_1R_2R_3$ boron compound are trialkyl compounds.

12. A process as claimed in claim 10 wherein the $R_1R_2R_3$ aluminum compound is triethylaluminum.

13. A process as claimed in claim 10 wherein step (a) comprises combining an anionic initiator, monomer and a vinyl modifier, wherein said monomer includes one or more conjugated diene monomers.

14. A process as claimed in claim 13 wherein said initiator is an organolithium compound.

15. A process as claimed in claim 13 wherein said monomer comprises 1,3-butadiene.

16. A process as claimed in claim 10 wherein the vinyl modifier comprises at least one of hexamethylphosphoric acid triamide, N,N,N',N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo [2.2.2] octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, tri-n-propyl amine, trimethyl amine, triethyl amine, N,N-dimethyl aniline, N-ethylpiperidine, N-methyl-N-ethyl aniline, and N-methylmorpholine.

17. A process as claimed in claim 13 wherein said monomer further comprises at least one of vinyl monomer.

18. A process as claimed in claim 10 wherein said polymerization in step (c) further comprises the use of at least one vinyl monomer.

19. A process comprising:
a. forming a living prepolymer high vinyl initiator with a vinyl content greater than about 45% using a vinyl modifier,
b. adding a $R_1R_2R_3$ aluminum or $R_1R_2R_3$ boron compound, and
c. initiating polymerization of diene monomers using said living prepolymer high vinyl initiator so as to form a polymer product with at least one high vinyl end segment,
wherein said polymer product has an overall vinyl content of less than 35%, and
said polymer product with a high vinyl end segment from step (c) is coupled to produce a further product with at least two high vinyl end segments, and $R_1$, $R_2$, and $R_3$ are selected from the group consisting of C1-C12 alkyl, C2-C12 alkene, C2-C12 alkyne, phenyl, alkyl-substituted phenyl and may all be identical or may all be separately selected but cannot be H.

20. A process as claimed in claim 19, wherein a di-coupling, tri-coupling, tetra-coupling, quatra-coupling, penta-coupling or hexa-coupling agent is used for the coupling.

21. A process as claimed in claim 19 wherein said polymerization in step (c) further comprises the use of at least one vinyl monomer.

22. A method comprising the steps of:
(a) adding the polymer produced in any of claims 1-8, 9, or 19-21 to a solvent comprising at least one vinyl monomer;
(b) optionally adding at least one additional inert solvent;
(c) optionally adding additives selected from the group consisting of extender oils, modifiers, and antioxidants,
(d) initiating polymerization of the vinyl monomer by the use of an initiator and/or heat,
wherein steps a, b and c can be performed in any order;
whereby the result of steps (a)-(d) is production of an engineered plastic; and
wherein the engineered plastic is selected from the group consisting of high impact polystyrene, styrene-maleic anhydride copolymer, methylmethacrylate-butadiene-styrene copolymer, transparent impact polystyrene, and acrylonitrile butadiene styrene copolymer.

23. A process comprising:
a. forming a living prepolymer high vinyl initiator with a vinyl content greater than about 45% using a vinyl modifier,
b. adding a $R_1R_2R_3$ aluminum or $R_1R_2R_3$ boron compound, and
c. initiating polymerization of diene monomers using said living prepolymer high vinyl initiator so as to form a polymer product with a high vinyl end segment
wherein said polymer product has an overall vinyl content of less than 35%, and
said polymer product with a high vinyl end segment from step (c) is coupled to produce a further product with at least two high vinyl end segments, and $R_1$, $R_2$, and $R_3$ are selected from the group consisting of C1-C12 alkyl, C2-C12 alkene, C2-C12 alkyne, phenyl, alkyl-substituted phenyl, and mixtures thereof and may all be identical or may all be separately selected but cannot be H
where step (c) is conducted at a maximum temperature that is no more than 20° C. higher than the maximum temperature at which steps (a) and (b) are conducted.

24. A process as claimed in claim 23, wherein a di-coupling, tri-coupling, tetra-coupling, quatra-coupling, penta-coupling or hexa-coupling agent is used for the coupling.

25. A process as claimed in claim 23 wherein said polymerization in step (c) further comprises the use of at least one vinyl monomer.

26. A process comprising:
a. adding an anionic initiator to a mixture of monomers in the presence of a vinyl modifier to form a living polymer with a vinyl content greater than about 45%;
b. adding a $R_1R_2R_3$ aluminum or $R_1R_2R_3$ boron compound to the mixture in step (a) when said living polymer has a number average molecular weight in the range of about 100 to about 20,000;
c. allowing said living polymer to obtain a number average molecular weight in the range of about 20,000 to about 500,000; and
d. optionally, coupling said living polymer;
wherein said living polymer produced in step (c) has an overall vinyl content of less than 35%, and
where $R_1$, $R_2$, and $R_3$ are selected from the group consisting of C1-C12 alkyl, C2-C12 alkene, C2-C12 alkyne, phenyl, alkyl-substituted phenyl and may all be identical or may all be separately selected but cannot be H.

* * * * *